United States Patent
Mintz

(10) Patent No.: US 7,103,470 B2
(45) Date of Patent: Sep. 5, 2006

(54) METHOD AND SYSTEM FOR MAPPING TRAFFIC PREDICTIONS WITH RESPECT TO TELEMATICS AND ROUTE GUIDANCE APPLICATIONS

(76) Inventor: Josef Mintz, 14 Savion Street, 49542 Petach Tqkva (IL)

(*) Notice: Subject to any disclaimer, the term of this patent is extended or adjusted under 35 U.S.C. 154(b) by 314 days.

(21) Appl. No.: 10/467,661

(22) PCT Filed: Feb. 8, 2002

(86) PCT No.: PCT/IB02/01996

§ 371 (c)(1),
(2), (4) Date: Aug. 11, 2003

(87) PCT Pub. No.: WO02/077945

PCT Pub. Date: Oct. 3, 2002

(65) Prior Publication Data

US 2004/0249559 A1    Dec. 9, 2004

Related U.S. Application Data

(60) Provisional application No. 60/267,693, filed on Feb. 9, 2001, provisional application No. 60/274,323, filed on Mar. 8, 2001, provisional application No. 60/289,083, filed on May 7, 2001.

(51) Int. Cl.
*G06G 7/76* (2006.01)

(52) U.S. Cl. .................. 701/117; 701/209; 701/210; 340/934

(58) Field of Classification Search ............... 701/117, 701/118, 209, 210; 340/934
See application file for complete search history.

(56) References Cited

U.S. PATENT DOCUMENTS 5,526,357 A    6/1996    Jandrell
5,532,702 A    7/1996    Mintz
5,812,069 A    9/1998    Albrecht et al.

(Continued)

FOREIGN PATENT DOCUMENTS

DE    196 39 546    4/1998

(Continued)

OTHER PUBLICATIONS

D. Kopitz & B. Marks, "Traffic and Travel Information broadcasting—protocols for the 21$^{st}$ century", EBU Technical Review—Spring 1999.

(Continued)

*Primary Examiner*—Thomas G. Black
*Assistant Examiner*—Christine M. Behncke
(74) *Attorney, Agent, or Firm*—Pearl Cohen Zedek Latzer, LLP

(57) ABSTRACT

A method is provided for predicting load of traffic of vehicles that are travelling according to non reference route plan, provided with Dynamic Route Guidance capability of their PMMS, in a Forward Time Interval related Route Segment and according to a predetermined protocol between mobile systems and a non mobile system platform of a SODMS. Using mobile units, a traffic prediction query is receiving according to a predetermined differential traffic load match process. A match process is performed by each of the mobile units and, according to a match, a predetermined response procedure is enabled, wherein a response procedure in each mobile unit uses a predetermined random process to select an allocated slot in which to transmit a predetermined signal, which provides an improved way to predict traffic in conjunction with off line database statistics, preferably with such that are being adaptively corrected by prior data and method to predict traffic which do not include, or lack sufficient erratic traffic information.

35 Claims, 1 Drawing Sheet

U.S. PATENT DOCUMENTS

| | | |
|---|---|---|
| 6,091,956 A | 7/2000 | Hollenberg |
| 6,256,577 B1 * | 7/2001 | Graunke ..................... 701/117 |
| 6,321,161 B1 * | 11/2001 | Herbst et al. ............... 701/210 |
| 6,401,027 B1 * | 6/2002 | Xu et al. .................... 701/117 |
| RE38,724 E * | 4/2005 | Peterson .................... 701/209 |
| 2002/0152018 A1 * | 10/2002 | Duckeck ..................... 701/201 |
| 2003/0069683 A1 * | 4/2003 | Lapidot et al. ............. 701/117 |
| 2004/0056797 A1 * | 3/2004 | Knockeart et al. ..... 342/357.13 |

FOREIGN PATENT DOCUMENTS

| | | |
|---|---|---|
| EP | 1024466 | 8/2000 |
| WO | WO 98/02835 | 1/1998 |
| WO | WO 98/02825 | 3/1998 |
| WO | WO 00/38090 | 6/2000 |
| WO | WO 00/73958 | 12/2000 |

OTHER PUBLICATIONS

International Search Report for International Application No. PCT/IB02/01996, dated Feb. 25, 2003.

European Search Report for European Application No. 02726383.9 dated Mar. 17, 2004.

European Search Report for European Application No. 02726383.9 dated Jun. 15, 2004.

Ben-Akiva M et al., "Development of a route guidance generation system for real-time application", Transportation Sestem 1997 (TS'97), proceedings volume from the 8$^{th}$ IFAC/IFIP/IFORS Symposium, proceedings of the 8$^{th}$ IFAC/IFIP/IFORS. Transportation System 1997 (vol. 3), Chanla, Greece, Jun. 16-18, 1997, pp. 405-410 vol. 1, XP 002271609, Oxford, UK, Pergamon, UK.

* cited by examiner

METHOD AND SYSTEM FOR MAPPING TRAFFIC PREDICTIONS WITH RESPECT TO TELEMATICS AND ROUTE GUIDANCE APPLICATIONS

RELATED APPLICATIONS

The present application claims priority of U.S. Provisional Application No. 60/267,693, filed Feb. 9, 2001, U.S. Provisional Applications No. 60/274,323, filed Mar. 8, 2001 and U.S. Provisional Application No. 60/289,083 filed May 7, 2001 which are incorporated by reference.

FIELD OF THE INVENTION

This invention relates generally to a method and system for mapping potential traffic loads in forward time intervals, according to various criteria which might indicate erratic traffic, as a result of expected increase in the number of Mobile Telematics Units (MTU) and In-Car Navigation Systems (CNS) users that use Dynamic Route Guidance (DRG). In particular, the method and system aims to provide an efficient means to estimate the potential increase or decrease in the number of vehicles in selected places (inconsistent traffic load), by using a radio system, in order to help in determining levels of a potential erratic behavior in the traffic due to the use of DRG by a significant percentage of vehicles. This system and method may further help to investigate sources of causes of erratic traffic and their level of effect, including the use of traffic information and reactions of drivers to telematics applications. This could help to improve traffic predictions for the use of traffic control and DRG. In particular, this method provides the ability to make use of a mapping system platform which has the capability to allocate pre-assigned slots or groups of slots for the detection of signal responses from mobiles that have probe response capability. The above identified system is mainly characterized by the ability of the mobiles to select time/frequency slots for response signals according to a mapping system query and according to a predetermined protocol. The detection of mobile transmission signals is mainly characterized by energy detection of mobile transmitted signals in allocated slots and hence there is no need for a repeat in mobile transmission as a result of signal collisions in the same slot. The non mobile platform of such a mapping system, which may be referred to hereinafter as Slot Oriented Discrimination Mapping System (SODMS), or as otherwise referred to, as well as the mobile (probe) response capability are described in U.S. application Ser. Nos. 09/945,257 and 09/998,061 filed Nov. 30, 2001 and PCT/ IB00/00239 and their own references.

DESCRIPTION OF RELATED ART

For example PCT publication WO 96/14586, published 17 May 1996, the disclosure of which is incorporated herein by reference, describes, inter alia, a system for mapping of vehicles in congestion. In one embodiment applicable to the mapping system platform, described in the above publication, a central station broadcasts a call to the vehicles which requests for example those vehicles which are stopped or which have an average velocity below a given value to broadcast a signal indicative of their position. Such signals are broadcast in slots, each of which represent one bit (yes or no) which relates to a position. Preferably, only one logical slot (that may be represented by more than one actual slot) is used to define the related position. Such signals are then used to generate a map of those regions for which traffic is delayed or otherwise moving slowly.

In the above-identified prior art, the possible construction of consistent traffic database for possible use with traffic predictions have been described. Such database could be constructed by traffic mapping of queues, when quasi-stationary (temporary stationary) statistics of traffic flow in a mapped road, at certain periods of time of a day, and for days in which traffic conditions, are considered to be repetitive. Such collected information, e.g., average arrival rates, could be used as off line database to predict traffic in conjunction with real time updates of mapped queues using statistical methods known in the art. By using the mapping method in this embodiment for mapping the potential effects of erratic traffic, either when produced as part of the current traffic mapping application of the mapping system platform (described by the above identified prior art) or by a separate platform with similar communication capabilities, it is possible to update the consistent traffic database by incorporating inconsistent traffic predictions.

BACKGROUND TO THE INVENTION

The expected increase in the number of Telematics applications by MTUs used with off-board or on-board route guidance as well as the increase in the number of CNS users would increase the percentage of vehicles that would use Dynamic Route Guidance and would hence result in unpredicted changes in traffic load which has the potential to cause erratic traffic.

Traditional traffic predictions could use a database of consistent traffic in order to predict traffic according to expected traffic loads, possibly also according to prior knowledge about the behavior of the traffic and the current conditions of traffic. However DRG effects on traffic might mostly be unpredictable by such a database. This could be the result even though there is a priori information about off board DRG (routs plans provided by common service centers), since deviations in the schedule of routes and possible use of alternative routes could in a short time make prior knowledge to become irrelevant to traffic prediction. Thus it would be valuable to have a means to update a traffic database that would be used in conjunction with consistent traffic information and possibly with other prior knowledge including current traffic information in order to improve the capability to predict potential changes in traffic.

Consistent Traffic is defined as such traffic that has a repetitive characteristic, with respect to specific time periods and places, (e.g. certain hour in a certain day of the week in a certain road). Consistent Traffic is a result of behavior patterns that from a statistical point of view usually and in general may be characterized. Such traffic characteristics may be stored in an off-line data base which may contribute to traffic predictions.

Inconsistent Traffic is defined as such traffic that has a non repetitive and erratic characteristic with respect to specific time periods and places. Such traffic may for example be the result of the ability by the individual driver to change routes according to current traffic loads. As the number of drivers that have access to detailed information on currently changing traffic increases, and as the number of drivers that possess in-car sophisticated capability to individually vary their previous route plans, and the less coordination if any exists amongst various drivers, the more inconsistent would become such traffic. Inconsistent Traffic is difficult if at all possible to be characterized on a statistical basis. Such traffic tends to be in general unpredictable, and leads to unpredictable traffic loads.

The inconsistent traffic is expected to become a significant issue in the control of the traffic when a significant percentage of cars will be using dynamic route guidance and as a result might probably, in themselves cause unexpected traffic loads at certain places that would affect the traffic and reduce the efficiency of dynamic route guidance. Traffic information used with Dynamic Route Guidance (DRG) could be one reason for the inconsistency in the traffic due to changes in planned routes, while driver preferences, deviation from schedule, or reaction to local based services could be other causes for an inconsistency in the conditions of the traffic.

One general approach to resolve the problem of predicting inconsistent traffic is to centralize the control of the individual driver routes. This is not the approach which is considered in the following embodiment of the invention as it leads to centralized DRG which has many disadvantages beside feasibility problems with large scale implementation.

As further explained, apart from the contribution of traffic predictions of inconsistent traffic to traffic control the predictions could further lead to a relatively low cost implementation of an anonymous predictive DRG approach based on distributed intelligence of the in car computers and also to contribute to the implementation of more efficient telematics applications.

Predictions for inconsistent traffic is based on a process of traffic load estimation for predetermined place and time interval, (for example, estimating the number of vehicles that use in-car navigation computers which are expected to pass in a certain road in a certain forward time interval). However when the source of such information is limited to car navigation units that use dynamic route guidance only, and the estimation process is the only means for such predictions, it would be required that most of the cars should use car navigation systems. In practice such a situation would doubtfully be viable. However, the situation when a significant percentage of vehicular systems would most probably be using Dynamic Route Guidance (DRG) may be considered realistic in the not too distant future, and hence inconsistent traffic would begin to appear at an early stage, whereas reliable traffic prediction for this situation would not yet be available. With the lack of traffic predictions, the problems that would be encountered at such stages could lead to a significant dilemma by the individual drivers, about the efficiency of Dynamic Route Guidance. The dilemma would be whether to consider recommended DRG according to current traffic, while ignoring unpredictable traffic that might result due to the significant number of DRG users, or ignoring the recommended DRG. For such early stages of inconsistent traffic the following embodiment suggests a modified method of traffic predictions in order to enable reliable prediction at such early stages. Traffic load predictions would preferably refer mostly to sensitive roads that encounter recurrent traffic jams.

SUMMARY OF THE INVENTION

The present invention provides a preferred method and system for differential mapping of potential traffic loads in forward time intervals in selected places, which could be a result of DRG, in order to provide rapid and effective means for traffic prediction. The mapping system, in which slots are allocated to probe responses, and mobile units that are equipped with route guidance with probe response capability in allocated slots, could be used as a platform for the following modified prediction method. The mobile unit would be referred to as Potential Mobile Mapping System (PMMS). The route guidance capability of a PMMS could be based on either on board or off board route guidance. The prediction method described in the following could be implemented with such platforms, either with or without the implementation of the application of mapping of current traffic as part of this platform. The non mobile part of the mapping system (non mobile systems), including the radio system and the mapping system, will be referred to as the non mobile system platform. All applicable terms used in the above identified prior art, in connection with traffic mapping, and which are applicable and would contribute to the implementation of the following embodiment of the invention, will hold also for this application.

The aim of the differential mapping method for determining potential traffic loads is to update a traffic information database with information about deviation from expected traffic loads in forward time intervals for selected road segments in order to enable more accurate and prediction capability of the use of a traffic information database. Based on the inherent limitations of the database prediction capability (before deviation updates), prediction criteria are formulated and could be transmitted by means of the non mobile platform to the PMMS units. Such criteria are intended to enable the prediction of expected potential deviations from schedule and previously planned routes, at the level of the database requirements. The PMMS units could determine if they match the transmitted criteria, and if a match exists, would respond accordingly. This could also be considered as a method to improve accuracy levels of information in database that could help to predict traffic according to pre-investigation of local potential loads affected by DRG in selected forward time intervals. The level of basic information in such database could for example include consistent traffic, or higher level prediction capabilities.

For example, if the use of the database is based on prediction capabilities according to consistent traffic, then cars that change their planned route according to traffic information, most probably from the shortest route according to time and distance to one that most probably is shortest according to time, or other dynamic preference, could be used to indicate on possibly expected inconsistent traffic that is not taken into account within consistent traffic statistics. Thus it would be worth to first isolate this group of cars in order to estimate their contribution to the inconsistent traffic loads in specific road segments. Preferably, this information would then be taken into account in conjunction with a database of consistent traffic statistics, preferably updated with current real time updates of traffic, to determine current and predicted traffic information that would be currently updated accordingly. The isolation process would use prediction queries that would selectively target cars that made a change to their route or deviated from schedule, according to traffic information or other predetermined possible reasons such as a response of drivers to a telematics application. The queries determine the response criteria which will include but not be limited to the following—a) vehicles that are planning to pass in a certain road at a certain forward time interval according to their modified route plan or schedule, and which did not plan to do so according to a reference route (e.g., a default route or any other route that could be referred by the PMMS as a reference that may be determined according to criteria as part of a predetermined protocol), and b) vehicles that did plan to pass in this road according to the reference route, and are not planning to do so according to the modified route plan or schedule, at the above forward time interval.

Vehicles which are using their reference (e.g. default) route will not respond to queries.

Criteria for determining whether a route is within reference conditions (e.g., default) or not, could be provided from a common external source, which considers the investigated level of possible effect on the traffic statistics. The reference (e.g., default) route information may be formed either in the in-car (on board) systems, or received from external (off board) sources, and would preferably be determined by route plan and schedule. Thus, according to a predetermined protocol, a deviation in route or schedule would exclude the route from being referred to as a reference route and would determine it to be a non reference route. The protocol would preferably include threshold levels of deviation.

Typical default routes are such which could be considered but not limited to conform with consistent traffic. Default routes could be determined according to common criteria (e.g. the shortest route, preferably with time schedules), for mobile units participating in the following processes. Non default routes are such that have some significant effect on known traffic statistics as a result of deviation from schedule or from original route plan that could be considered as default routes.

The in-car system will incorporate a predetermined decision procedure, described in the following.

In principle, a Differential Traffic Load Prediction (DTLP) process with respect to a Forward Time Interval related Route Segment (FTIRS refers to a time interval with respect to a route segment, usually a road segment) under investigation, could be implemented by means of two types of traffic prediction queries which would be transmitted by a mapping system to the PMMS units. The prediction queries include the prediction criteria, and are aimed at targeting groups of cars that are either expected to pass through the FTIRS under investigation and were not expected to do so, according to database information, (non expected vehicles—NEV), or are not expected to pass through the FTIRS under investigation, and were expected to do so, according to the database information (expected vehicles—EV);—

Query-A):—type of a query with the aim of estimating the number of vehicles which on their reference route are not expected to pass through the investigated FTIRS, and on their non reference route are expected to pass through the investigated FTIRS, (non expected vehicles—NEV), and Query-B):—type of a query with the aim of estimating the number of vehicles which on their reference route are expected to pass through the investigated FTIRS and on their non reference route are not expected to pass through the investigated FTIRS, (expected vehicles—EV).

In order to enable responses in relation to forward time intervals, it is required that the PMMS units would be equipped with the means of reference or mean to calculate reference to segments of planned routes and estimated travel time intervals is along respective route segments. Preferably, an estimated time interval will be provided with respective confidence intervals.

Vehicles which are using a non reference planned route, will enable the response procedure according to the following decision procedure;

If the received query is identified as Query A, then, according to the following differential traffic load match process result, if there is a match between FTIRS in the query and the planned non reference (e.g., default) route (route in use), and there is no match between FTIRS in the query and the reference route, then enable the response procedure.

If the received query is identified as Query B, then, according to the following differential traffic load match process result, if there is a match between FTIRS in the query and their reference route, and there is no match between the FTIRS in the query and non reference route (route in use), then enable the response procedure.

Enabling the response procedure, in the predetermined decision procedure, would preferably be expanded to include additional criteria, for targeting vehicles. For example, with respect to Query A, additional criteria in checking an interval estimate for the probability to arrive within the investigated FTIRS, would preferably be taken into account as part of the decision procedure.

In order to alleviate the computation load in the in-car system, involved in frequent matching in response to above queries, it would be preferable to refer routes to predetermined area zones, and by a preliminary predetermined screening procedure, preceding the above decision procedure, vehicles whose planned (reference and non reference) routes do not cross area zones in which the FTIRS is included, will not continue with the more detailed matching process in the above decision procedure.

A number of communication slots will be preferably allocated for responders (cars which transmit in the allocated slots) in the response procedure, separately, with respect to each Query. Each of the targeted vehicles, (responders), in which the response procedure is enabled, will use a predetermined response procedure to select a slot in which to respond. This predetermined procedure would preferably use a uniformly distributed random selection of a slot out of all the allocated slots, to transmit a signal.

In accordance with an embodiment of the invention, there is thus provided a method of predicting load of traffic of vehicles that are traveling according to non reference route plan, provided with Dynamic Route Guidance capability of their PMMS, in a Forward Time Interval related Route Segment and according to a predetermined protocol between mobile systems and a non mobile system platform of a SODMS, the method comprising:

(a) receiving by mobile units a traffic prediction query and according to a predetermined differential traffic load match process, (b) performing a match process by each of the mobile units and, according to a match, (c) enabling a predetermined response procedure wherein a response procedure in each mobile unit uses a predetermined random process to select an allocated slot in which to transmit a predetermined signal, which provides an improved way to predict traffic in conjunction with off line database statistics, preferably with such that are being adaptively corrected by prior data and method to predict traffic which do not include, or lack sufficient erratic traffic information.

In another embodiment of the invention it would be valuable to use traffic predictions in conjunction with applications which have a potential to cause erratic conditions of traffic. Such applications could include local based services in telematics and in particular position related commerce (p-commerce sometimes referred to as l-commerce or m-commerce). There might be different ways to implement p-commerce and hence to increase the level of unpredicted traffic. For example in order to improve p-commerce applications, it would be an advantage to large stock holders and others to have a query tool that would help them to identify sufficient demand, preferably according to prices and including non solicited products, for special offers. This could create a hunting trip environment. With such a tool, queries could be provided in a way similar to an auction process, preferably by a broadcast message to the telematics users, with respect to products with possibly one or more ranges of prices. The user, usually a driver, will have a stored list of preferences for products, in his Telematics Computer (TC which could be the computer of a Telematics-PMMS) that would be matched with broadcast messages according to preferences in the list. For example, a stored product list (SPL) which may include products with ranges of prices could enable the TC to respond to a broadcast query. If such responses would provide information about the estimated number of the potential clients and possibly their position distribution it would enable the vendor to determine a time window and price for a special offer according to demand. The offer could then target the potential clients. Most probably this would target the responders who would contribute to the decision making. When considering a system platform with capabilities such as suggested for a traffic mapping system, both, in this embodiments of the invention and in the reference prior art, together with telematics mobile unit with PMMS capabilities, which enable to estimate the number of responders to a query by random response in pre determined number of slots, it would be possible to implement a hunting trip application, efficiently.

Thus in accordance with this embodiment of the invention, there is thus provided a method for estimating according to criteria and a predetermined protocol local demand (e.g., for products or services) according to SPL, preferably in conjunction with predicting respective load of differential traffic in forward time intervals for selected places which might result from a hunting trip application, and according to a further predetermined protocol between TCs and a non mobile system platform of a SODMS, the method comprising:

(a) receiving by TC units a query of a hunting trip application and according to a predetermined match process, (b) performing a match process by each of the TC units and, according to a match, (c) enabling a predetermined response procedure wherein a response procedure in each TC unit uses a predetermined random process to select an allocated slot in which to transmit a predetermined signal.

DETAILED DESCRIPTION OF THE DRAWINGS

Figure 1:
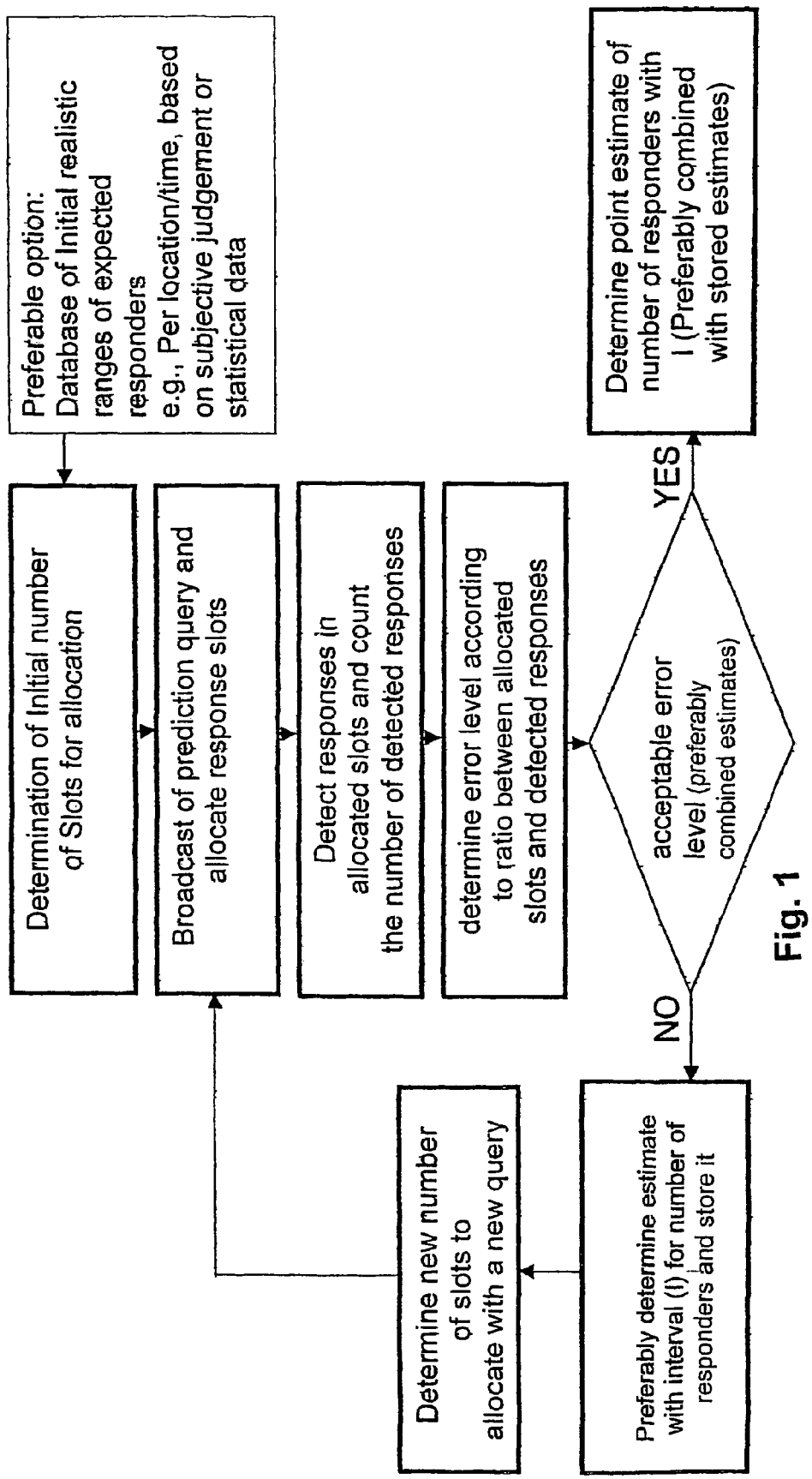
FIG. 1, describes an iterative estimation procedure that is preferably used with more than a single iteration of estimation (separate allocation of slots with each iteration). The iterative estimation procedure is preferably aimed to obtain an estimated result of the number of responders with a restricted acceptable error level and to reduce biasness. The error level of the estimate in a single iteration is a function of the ratio between the number of slots in which responses are detected (responding slots) and the given number of allocated slots. Since the ratio of responding slots to a given number of allocated slots would be a result of the number of responders, it is desirable to assess in advance a realistic anticipated range of responders, in order to determine a minimal number of initial allocated slots.

FIG. 1, describes an iterative estimation procedure that is preferably used with more than a single iteration of estimation (separate allocation of slots provided with each performed iteration). The iterative estimation procedure is preferably aimed to obtain an estimated result of the number of responders with a restricted acceptable error level, to reduce biasness and to check consistency. The error level of the estimate in a single iteration is a function of the ratio between the number of slots in which responses are detected (responding slots) and the given number of allocated slots. Since the ratio of responding slots to a given number of allocated slots would be a result of the number of responders, it is desirable to assess in advance a realistic anticipated range of responders, in order to determine a minimal number of initial allocated slots. Since such realistic ranges of responders could be anticipated from statistical data, according to time and place, then a data base of possible initial ranges would preferably be evolved for any particular urban entity, preferably as probability distribution from which ranges of confidence intervals could be derived. Combined estimates that can use joint probabilities and Bayesian methods as described above with respect to FIG. 1 are described in more detail in the detailed description of Preferred Embodiment of the invention.

DETAILED DESCRIPTION OF A PREFERRED EMBODIMENT

The present invention provides a preferred method and system for differential mapping of potential traffic loads in forward time intervals in selected places, which could be a result of DRG, in order to provide rapid and effective means for traffic prediction. The mapping system, in which slots are allocated to probe responses, and mobile units that are equipped with route guidance with probe response capability in allocated slots, could be used as a platform for the following modified prediction method. The mobile unit would be referred to as Potential Mobile Mapping System (PMMS). The route guidance capability of a PMMS could be based on either on board or off board route guidance. The prediction method described in the following could be implemented with such platforms, either with or without the implementation of the application of mapping of current traffic as part of this platform. The non mobile part of the mapping system (non mobile systems), including the radio system and the mapping system, will be referred to as the non mobile system platform. All applicable terms used in the above identified prior art, in connection with traffic mapping, and which are applicable and would contribute to the implementation of the following embodiment of the invention, will hold also for this application.

The aim of the differential mapping method for determining potential traffic loads is to update a traffic information database with information about deviation from expected traffic loads in forward time intervals for selected road segments in order to enable more accurate and prediction capability of the use of a traffic information database. Based on the inherent limitations of the database prediction capability (before deviation updates), prediction criteria are formulated and could be transmitted by means of the non mobile platform to the PMMS units. Such criteria are intended to enable the prediction of expected potential deviations from schedule and previously planned routes, at the level of the database requirements. The PMMS units could determine if they match the transmitted criteria, and if a match exists, would respond accordingly. This could also be considered as a method to improve accuracy levels of information in database that could help to predict traffic according to pre-investigation of local potential loads affected by DRG in selected forward time intervals. The level of basic information in such database could for example include consistent traffic, or higher level prediction capabilities.

For example, if the use of the database is based on prediction capabilities according to consistent traffic, then cars that change their planned route according to traffic information, most probably from the shortest route according to time and distance to one that most probably is shortest according to time, or other dynamic preference, could be used to indicate on possibly expected inconsistent traffic that is not taken into account within consistent traffic statistics. Thus it would be worth to first isolate this group of cars in order to estimate their contribution to the inconsistent traffic loads in specific road segments. Preferably, this information would then be taken into account in conjunction with a database of consistent traffic statistics, preferably updated with current real time updates of traffic, to determine current and predicted traffic information that would be currently updated accordingly. The isolation process would use prediction queries that would selectively target cars that made a change to their route or deviated from schedule, according to traffic information or other predetermined possible reasons such as a response of drivers to a telematics application. The queries determine the response criteria which will include but not be limited to the following—a) vehicles that are planning to pass in a certain road at a certain forward time interval according to their modified route plan or schedule, and which did not plan to do so according to a reference route (e.g., a default route or any other route that could be referred by the PMMS as a reference that may be determined according to criteria as part of a predetermined protocol), and b) vehicles that did plan to pass in this road according to the reference route, and are not planning to do so according to the modified route plan or schedule, at the above forward time interval.

Vehicles which are using their reference (e.g. default) route will not respond to queries.

Criteria for determining whether a route is within reference conditions (e.g., default) or not, could be provided from a common external source, which considers the investigated level of possible effect on the traffic statistics. The reference (e.g., default) route information may be formed either in the in-car (on board) systems, or received from external (off board) sources, and would preferably be determined by route plan and schedule. Thus, according to a predetermined protocol, a deviation in route or schedule would exclude the route from being referred to as a reference route and would determine it to be a non reference route. The protocol would preferably include threshold levels of deviation.

Typical default routes are such which could be considered but not limited to conform with consistent traffic. Default routes could be determined according to common criteria (e.g. the shortest route, preferably with time schedules), for mobile units participating in the following processes. Non default routes are such that have some significant effect on known traffic statistics as a result of deviation from schedule or from original route plan that could be considered as default routes.

The in-car system will incorporate a predetermined decision procedure, described in the following.

In principle, a Differential Traffic Load Prediction (DTLP) process with respect to a Forward Time Interval related Route Segment (FTIRS refers to a time interval with respect to a route segment, usually a road segment) under investigation, could be implemented by means of two types of traffic prediction queries which would be transmitted by a mapping system to the PMMS units. The prediction queries include the prediction criteria, and are aimed at targeting groups of cars that are either expected to pass through the FTIRS under investigation and were not expected to do so, according to database information, (non expected vehicles—NEV), or are not expected to pass through the FTIRS under investigation, and were expected to do so, according to the database information (expected vehicles—EV);—

Query-A):—type of a query with the aim of estimating the number of vehicles which on their reference route are not expected to pass through the investigated FTIRS, and on their non reference route are expected to pass through the investigated FTIRS, (non expected vehicles—NEV), and Query-B):—type of a query with the aim of estimating the number of vehicles which on their reference route are expected to pass through the investigated FTIRS and on their non reference route are not expected to pass through the investigated FTIRS, (expected vehicles—EV).

In order to enable responses in relation to forward time intervals, it is required that the PMMS units would be equipped with the means of reference or mean to calculate reference to segments of planned routes and estimated travel time intervals along respective route segments. Preferably, an estimated time interval will be provided with respective confidence intervals.

Vehicles which are using a non reference planned route, will enable the response procedure according to the following decision procedure;

If the received query is identified as Query A, then, according to the following differential traffic load match process result, if there is a match between FTIRS in the query and the planned non reference (e.g., default) route (route in use), and there is no match between FTIRS in the query and the reference route, then enable the response procedure.

If the received query is identified as Query B, then, according to the following differential traffic load match process result, if there is a match between FTIRS in the query and their reference route, and there is no match between the FTIRS in the query and non reference route (route in use), then enable the response procedure.

Enabling the response procedure, in the predetermined decision procedure, would preferably be expanded to include additional criteria, for targeting vehicles. For example, with respect to Query A, additional criteria in checking an interval estimate for the probability to arrive within the investigated FTIRS, would preferably be taken into account as part of the decision procedure.

In order to alleviate the computation load in the in-car system, involved in frequent matching in response to above queries, it would be preferable to refer routes to predetermined area zones, and by a preliminary predetermined screening procedure, preceding the above decision procedure, vehicles whose planned (reference and non reference) routes do not cross area zones in which the FTIRS is included, will not continue with the more detailed matching process in the above decision procedure.

A number of communication slots will be preferably allocated for responders (cars which transmit in the allocated slots) in the response procedure, separately, with respect to each Query. Each of the targeted vehicles, (responders), in which the response procedure is enabled, will use a predetermined response procedure to select a slot in which to respond. This predetermined procedure would preferably use a uniformly distributed random selection of a slot out of all the allocated slots, to transmit a signal.

A predetermined estimating procedure will be used in the non mobile system platform, to determine estimated number of responders according to the total number of slots in which responses are detected in a given number of allocated slots. The estimating procedure would preferably use a number of secondary procedures, as described in the following and illustrated in FIG. 1. It is preferably aimed to obtain the estimated number of responders with an acceptable error level, however the error level is a function of the ratio between the number of responders and the given number of allocated slots. The greater the number of allocated slots in proportion to the number of responders, the lower would be the error level. The error level can be defined as the maximum cumulative probability that could produce a similar result from a number of responders which is either greater or lower than the acceptable estimation interval of responders. The acceptable error level would preferably be determined according to the sensitivity of the estimation in the specific application. Since there is a variation around the most frequent number of responding slots, (slots in which responses are detected), which depends on the number of allocated slots and the number of responders, it is desirable to assess in advance a realistic anticipated range of numbers of responders, in order to determine a minimal number of initial allocated slots for an acceptable variance. Since such realistic ranges of responders could be anticipated from statistical data, according to time and place, then a database of possible initial ranges would preferably be evolved for any particular urban entity, (preferably as probability distribution from which ranges of confidence intervals could be derived). The database of ranges would be preferably evolved taking into account conditions specific to such an entity, such as, (but not limited to), characteristic traffic conditions, characteristic infrastructure servicing traffic flow, and prevailing decision processes used by route guidance procedures. The technique of evolving a database of ranges for initial numbers of expected responders would preferably be based on statistical and empirical methods and computer simulations. In order to determine the required initial number of allocated slots, based on the database of ranges, it is also preferably required to take into account the prevailing conditions in available radio communication spectrum, limitations imposed by the need to investigate preferred number of FTIRS in a reasonably meaningful short cycle time, and an acceptable tolerable error in the resulting predictions. Since the initial determined number of allocated slots might not achieve the preferably acceptable error level, successive repetitive iterations in allocation of slots and re-estimation of number of responders, might be required. In order to determine the possible need for adjustment of number of allocated slots in a minimal number of iterations, an error estimating function, and an optimized adjustment function, would preferably be evolved. The error estimating function would preferably estimate the error, (e.g., by confidence interval) in the resulting estimated number of responders, as a function of the ratio between the number of detected number of responding slots (responses) and number of allocated slots (preferably considering the probability distribution of responders). Based on the error estimating function, the required preferred number of allocated slots may have to be adjusted for a further iteration, and may also vary during a possible series of iterations. The optimized adjustment process in arriving at the preferred number of allocated slots with a minimal number of iterations would preferably use earlier results (with a non acceptable tolerable error), to predict according to statistical combination the required improvement in the error level (e.g., computing Maximum Likelihood Estimates or Estimates), and to determine accordingly the preferred required number of allocated slots to be used in the subsequent iteration, in order to save further iterations. The significance in performing iterations is, in addition to the potential in reducing the error level, in checking consistency, particularly in cases where little, or no, a-priori knowledge exists about the probability distribution of responders that provide a certain number of responses. Thus, at least two iterations would preferably be allowed even though the first proportion between the number of responses and allocated slots might be satisfying, i.e., indicating on an acceptable error level.

The estimating procedure would preferably use statistical methods which could produce acceptable estimation intervals (based on interval estimation approach such as confidence and tolerance intervals with upper and lower limits). A single point that is the most frequent number of responses (responding slots) in a pre-determined number of slots for pre-determined simulated (or analytically calculated) number of responders could provide the distribution of the number of responses around this point and could determine a tolerance interval for the interval estimate. The most frequent number of responses will be referred to in the following as single point estimate for the number of responders in a predetermined number of slots. One conservative way of determining an acceptable estimation interval for decision making about the possible range of responders that respond by a certain number of responses in a predetermined number of allocated slots, is by first determining a tolerance interval according to a respective single point estimate, either produced by a simulation of responses according to a certain repeated number of responders in certain number of allocated slots or by analytical calculation, then, to determine according to the response distribution of the responses an acceptable tolerance interval. Based on the acceptable tolerance interval it is enabled to determine, either by simulation or by analytical calculation, two other response distributions for the same number of allocated slots which indicate on the potential of an upper and lower number of responders to produce responses within the acceptable tolerance interval, by determining acceptable error e.g., according to cumulative-probability of the overlap (analogous to error type II in hypothesis testing, with respect to an acceptance region). As a result of the single point estimates of the upper and lower distributions of responses which overlap with the tolerance interval within an acceptable error it would be enabled to determine upper and lower numbers of responders which could be used to further determine upper and lower limits to an acceptable interval for the estimation of potential responders that might produce the same number of responses in the allocated slots. The upper and lower limits of this interval could be determined with respect to the sensitivity of the decisions that have to be taken accordingly. Such limits could also be interpreted as determining the rejected regions of potential responders. From the point of view of the acceptable estimation interval definition, for a significantly wide range of different numbers of responses for a sufficient number of slots, consistency in terms of percentage of error would be expected around said single point estimates for a respective range of responders due to close to linear relation between said single point estimates and respective responders in that range. An alternative approach to determine estimation intervals is by producing probability distribution function (PDF) of potential responders around a said single point estimate, either analytically or by simulation, from which the acceptable estimation interval could be derived e.g., according to the confidence interval of this PDF. Such a PDF could be used for traffic behavior analysis according to different criteria, e.g., criteria which characterize reaction of mobile units to telematics applications, which may cause erratic traffic. Each PDF could be derived for a certain number of allocated slots by normalizing simulated distributions of the relative frequency of a certain number of responses, determined by a said single point estimate related to a certain number of responders, which may be produced with other (lower) relative frequency by responders which have a different number from the number of responders which relates to the said point estimate. A sufficiently high range of the number of responders should be used to enable the normalization of the relative frequencies of the responses to determine a said PDF. For high accuracy of the relative frequencies that should be determined also for high number of potential responders (theoretically unlimited but practically limited by the application) a sufficiently high number of repetitions of response procedures should be used, to determine the relative number of the responses, for the said number of responses determined by the said single point estimate of responders (tested according to a number of allocated slots). Repeating the simulation for a sufficient range of numbers of responders to provide relative frequencies of the same number of responses around relative frequency derived according to the said single point estimate would determine a distribution of the said number of responses according to the (practical) range of numbers of the potential responders. According to the accumulated number of responses that produce the relative frequencies of responses (according to the said sufficiently high number of repetitions to the same number of responders) a normalization phase can be taken to produce a said PDF. The simulation could be further expanded to determine such distributions for different numbers of allocated slots around different numbers of responders (determined by said single point estimate). Such PDFs could be used to provide confidence intervals for single estimate of responders with single allocation of slots. For estimates that would use more than a single allocation of slots it would be valuable to create joint PDFs for combinations between different numbers of slots with different numbers of responders related to the said single point estimates. Error estimating functions could further be formulated according to statistical methods and by simulations that could consider a-priori knowledge about the probability distribution of responders (Bayesian approach). The estimating process would count the number of the slots that were detected to be used by at least one responder and will use this number as an input to a predetermined estimating function (e.g., based on pre stored table that includes PDFs, confidence intervals, and upper and lower limits of said acceptable estimation intervals, constructed according to simulations) which could provide required estimates as a function of number of slots detected to be used by responders in the allocated slots. The estimate would be considered as the estimation of the number of vehicles according to the query criteria. Estimating functions (tables) could be predetermined preferably by using the described method for simulation and other statistical methods known in the art. Separate estimating functions would be preferably evolved for various ranges of numbers of allocated slots. An increase in the number of allocated slots ought to shorten the acceptable estimation interval. In practice this would enable to use more efficiently the allocated communication resources. Response and detection procedures could further include a possible discrimination between number of responders in each slot. However this would require accurate power control on the transmitters of the responders which for short burst transmissions could be more costly to be implemented (e.g., CDMA). Non information signals would be preferably used by the responders. However, if information bearing signals are used by the responders capture effects also could be considered to distinguish between slots. Nevertheless short energy burst in slots could minimize time of detection and hence preferably fit to the response procedure where responders use allocated slots randomly by the responders and the detection process of their transmitted signals could consider just energy detection.

The estimations that may according to one type of query selectively represent additional number of vehicles that were not expected (preferably according to probabilistic levels) to arrive to the FTIRS, (NEV), and according to a different type of query, the number of vehicles that were expected (preferably according to probabilistic levels) to arrive to the FTIRS and would not arrive to the FTIRS, (EV), would indicate on change in expected load, in the FTIRS. This could be used in conjunction with an off line database of traffic statistics to determine according to the expected traffic and the non expected traffic (predicted differential traffic load) the weighted sum of the missing EVs and the additional NEVs with the predictable traffic load in the segment of road (e.g., by using statistical methods known in the art such as convolution between PDF of the estimate of the expected load in the database and the estimated number of NEVs, would provide a PDF of the updated estimate to be used for the computation of a new expected load due to NEVs).

For this purpose it would be useful to construct respective PDF's in conjunction with the function tables that are produced to provide estimation intervals, as further described in the detailed description. This is the basis for an improved way to predict traffic in conjunction with off line database statistics, preferably with such that are being adaptively corrected by mapping of the current traffic.

In addition to the contribution potential of such improvement to central control on traffic it would have the potential to improve, and even enable, reliable dynamic route guidance. However the way of how to use such predictions is a very important issue when considering the extensive use of car navigation systems, in which the planned routes are being independently modified according to such predictions. The following highlights a preferable method by which such predictions could enable efficient distributed DRG.

In order to explain the benefit of this approach for implementing distributed DRG it would be worth to describe traditional approaches in comparison.

In order to overcome unpredictable traffic problems, in the future, traditional approaches are considering a system that would be almost fully controlled, i.e., in-car computers will not make the decisions for their best route but rather a Big Brother approach will do it by providing the recommended routes in order to maintain predictive traffic. This approach would use a central computation method that will have to maintain the knowledge on the destination of each vehicle as well as its current position along the road. Beside the numerous computations that it would require it would need a communication platform that would have to accommodate a huge volume of data that will connect the vehicles to the control center. In practice, roadside beacons that have two way communication capabilities are considered for this purpose. Apart from the non privacy characteristic of such a system it will have a tremendous cost and will require computation power that probably makes the idea impractical for wide coverage implementation. This problem increases when a significant number of drivers would not obey the central route guidance, and hence it will reduce the system efficiency and could even make it unreliable. For such reasons a concept of predictive Dynamic Route Guidance based on distributed intelligence should preferably be used whereby in-car computers would be making decisions on their preferred routes. However, with such an approach the traffic would probably become even more unpredictable. To overcome this problem there would be a need to cope with unpredicted traffic in a way such as proposed above and to use periodical corrections to statistical traffic databases. To realize such an approach, predicted traffic information would have to be, periodically, estimated and then provided to the car navigation computers so that a trial and fail based process would be used to refine an equilibrium between the individual needs and the offered traffic routes. This would implement a system based on distributed intelligence in which, in addition to taking into account current traffic information, the car navigation computers would have to use a predetermined give-up process which, according to the predicted traffic information and their planned route, each car would try to identify if its planned route is going to take part in a predicted traffic congestion or traffic jam. The identification of such situation would result from a comparison between the predicted traffic information and the planned route. If the comparison would identify predicted traffic congestion along the planned route it would automatically give up on its planned route, if it would have a more reasonable alternative route. The give up process would preferably be used according to priorities and could consider various criteria levels. For example, in a first iteration of such trial and fail cycle, cars that would have an alternative route that might increase the length of their planned route by, say 5 percent, but would not significantly affect their traveling time, would automatically change their planned route to the alternative route which a-priori had a lower priority. A further cycle of prediction and update to the cars, probably indicating on changes in traffic predictions according to the reactions of cars to the previous give up procedure cycle, could either result in additional cars, with a higher grade of give up level (e.g., alternative route with say 10% increase in length to remainder of planned route), to give up on the planned route, if previously predicted traffic congestion still predicted. Such procedures might, some times, allow cars to return to an earlier, more preferable, route (reduced grade of give up level), in the case that too many cars have given up on their planned routes at a previous iteration, and accordingly traffic loads are alleviated. In addition to predetermined give up process based on parameters of increase and reduction of give up levels, random parameters might preferably be used in order to refine, and even to control the convergence iterative process. As a result of a sufficient number of such iterations, this process could lead to a convergence to equilibrium, with the grade of give up level and its reduction tapering off. Trade off between low and high levels of give up grades would preferably be taken into account, with the parameters of the iterative process.

When Car Navigation System (CNS) with on board DRG capability are considered as being used it would be easy to observe the benefit of such approach since periodical process of such prediction processes could help to refine the preferred route by on board DRG of the CNS units. However one of the trends in telematics is to provide off board DRG to Telematics Computers (TC) installed in cars. Such TC would be provided with a recommended route and according to in-car positioning means the TC could navigate the driver along the route. Thus to enable handling the traffic predictions in an environment that partially use TC with off board DRG and another part uses CNS units with on board DRG it would be necessary to provide enhanced capability to TC units. For example, a TC will be provided with a few alternative routes, (e.g., bypass segments of routes), in order to overcome possible traffic load problems in predetermined segments investigated in the prediction process. These alternatives, would be used, according to priorities by the TC, that would be equipped with a radio interface, such as used with the CNS having on board DRG, enabling it to participate in prediction processes. Thus, by participating in the prediction processes the route plan would be refined by using a give up procedure, according to a balance between current and predicted traffic.

The predicted information would be preferably provided through a broadcast channel, e.g., RDS/TMC, to car navigation end users and off board DRG service providers as well as to traffic control centers.

Another embodiment of the implementation the differential traffic prediction process deals with effects on traffic loads as a result of telematics applications, such as Local Based Services. One type of such telematics application is position related commerce service, sometimes named as p-commerce, m-commerce or l-commerce. With such a service application, a service user would preferably initiate a request to locate points of interest according to criteria. For example a request may ask for locations where a certain product may be found, with possible restrictions to some range of prices and possibly within a certain distance from the user's position. Another application of telematics is more advertisement oriented and could be initiated by a vendor who wishes to provide ordinary or special offers to drivers possibly for a short term. In order to enable the vendor to administer such offers efficiently it would be valuable to have a priori knowledge about the potential demand for an offer. One way to get such information is to use recorded information of requests initiated by the potential buyers to assess the demand potential for a certain level(s) of price. A problem, involved with special offers, could be the lack by vendors of a priori knowledge about potential buyers who might otherwise show interest in many different products, other than those, subject to a special offer.

Beside the effect of p-commerce on the traffic load there might be different ways to implement p-commerce and hence to increase the level of unpredicted traffic. For example in order to improve p-commerce applications, it would be an advantage to large stock holders and others to have a query tool that would help them to identify sufficient demand, preferably according to prices and including non solicited products, for special offers. This could create a hunting trip environment. With such a tool, queries could be provided in a way similar to an auction process, preferably by a broadcast message to the telematics users, with respect to products with possibly one or more ranges of prices. The user, usually a driver, will have a stored list of preferences for products, in his Telematics Computer (TC) that would be matched with broadcast messages according to preferences in the list. For example, a stored product list (SPL) which may include products with ranges of prices could enable the TC to respond to a broadcast query. If such responses would provide information about the estimated number of the potential clients and possibly their position distribution it would enable the vendor to determine a time window and price for a special offer according to demand. The offer could then either target the potential clients and possibly others. Most probably this would target the responders who would contribute to the decision making. When considering a system platform with capabilities such as suggested for a traffic mapping system and telematics mobile unit with PMMS capabilities, (that uses pre assigned slots to determine position and other distributions of responders according to queries, and possibly to estimate the number of responders to a query by random response in pre determined number of slots), it would be possible to implement a hunting trip application, efficiently.

A possible scenario could start with an update of one or more products in the SPL (in the TC) according to predetermined criteria (for example a product name and range of prices of interest). A driver who enables the hunting trip application of the TC would enable the TC to listen to broadcast queries and to participate in responses to such queries. Queries would be matched with the SPL and would enable a response of the TC to an identified match. If the query is a distribution related query then according to a predetermined protocol the TC would initiate a response in a communication slot which best indicates on its attribute according to a characteristic value. For example, for a query which investigates distribution of potential clients in a restricted area, and determines responses to be activated in predetermined slots, it would respond in a slot that would best indicate on its position, in a range determined by the slot. In this case the characteristic value corresponds directly to position. Another possibility could be the use of a characteristic value that corresponds to estimate of time of arrival, which would require calculated travel time, in which case the query would possibly relate to time of arrival distribution, rather than user position. Another possibility could estimate statistically the number of potential clients by responding, according to a predetermined protocol, randomly in determined number of slots which could provide, according to the proportion between the number of slots that were used by the responders and the number of the allocated slots to responses, an estimate to the number of the potential of respectively hooked vehicles (such an estimation could use the interval estimate approach described with the differential traffic load prediction method of estimating traffic loads in FTIRS). An assessment of the demand could help the vendor to determine whether to make an offer and for what price. Above methods may be used independently or in combination with each other in order to enable a vendor to make a decision about presenting an offer.

Implementing an offer could possibly use a broadcast message, which would refer to a specific previous investigation query, and user vehicles which had previously responded to this query, would be targeted by their matching with the record in the TC of the response to the query, and which was stored according to the predetermined protocol. The targeted user could then be invited- to respond by manual intervention and possibly confirm his wish to accept the offer. At this stage the vendor could possibly initiate an additional second broadcast query targeted to the users that accepted the offer, according to the record stored in the TC, with respect to the specific message, in order to finally assess the demand. The user vehicles in which there is a match between the second broadcast query and the stored record in the TC would respond in slots according to the predetermined protocol with respect to this query. The vendor could then confirm the offer, by implementing a broadcast message to the responders to the second query. At this stage it would be a preferable possibility to enable a registration process, in order to ensure purchase. Any communication method used with the TC may be used for this purpose. However such processes and other telematics applications have the potential to create unpredictable traffic due to changes in planned routes. Thus a further process that would involve estimates of deviations in traffic loads as a result of such processes could be used. For example TC units which each could be part of a PMMS (Telematics PMMS—TPPMS) that made a change to route plans according to a telematics application such as a hunting trip could be targeted by traffic prediction queries by criteria that include recent change to the route plan according the telematics application. Implementation of such traffic predictions would a) help investigate the influences of such telematics applications upon traffic, and b) enable possible processes of control of such influences, for example, by controlling the scope of the offers, so as to obviate resulting traffic congestions. (In hunting trip applications this might take the form of limiting the scope of offers to a given acceptable range, or to limit potential arrivals from certain directions or through certain road segments).

The invention has been described herein using examples in which the indication signals transmitted by the responders in the allocated (transmission) slots are transmitted in time, frequency or time and frequency slots, preferably as RF (radio frequency) pulse. Other types of transmission slots are also useful in the invention such as frequency hopping and other spread-spectrum transmission slots. The term "transmission slots" or "slots" as used herein includes all these types of slots.

In a case when there would be possibly a need to further map traffic queues in the local area in order to complement or improve the level of consistent type traffic information, possibly as a result of the need to use in conjunction with the need to map erratic traffic as a result of local based telematics services, such as mentioned in an embodiment above. One method proposed by above identified prior art was to map traffic queues. In this respect a further embodiment, provided by the following, could improve the radio communication efficiency for queue mapping for a slot oriented discrimination mapping system (SODMS) described in the above identified prior art.

When assigned slots are allocated to construct a mapping sample according to a distance from a mapping focus, there is a way which enables to save the number of allocated slots by considering that in any subsequent mapping sample, in mapping a queue of vehicles, it is just required to check if a new probe, arriving to the queue after a previous mapping sample, is farther from the mapping focus than the farthest probe in a previous mapping sample. Thus, in a preferable implementation process of sampling, the assignment of allocated slots in a mapping sample that is taken subsequently, (to a mapping sample in which the farthest probe was detected), can be limited for a segment in the road that starts at a position which was identified as the position of the farthest probe (from the mapping focus) in a previous mapping sample. The subsequent sample would cover the mapped range in a direction farther from the mapping focus, for a length which may preferably be determined from statistical data. Additional slots may preferably be allocated exclusively to the farthest identified probe in a mapping sample, in order to determine the motion rate in a queue according to the motion distance of the farthest probe in between successive mapping samples. These slots could be used by such probe for transmission of data in any one of two ways, either by regular modulated data communication, or by constructing a respective code by means of which such a probe may use more than one of these exclusively assigned slots in order to determine its motion distance.

By arranging the allocated slots in an opposed order to the queue, i.e., an order in which the increase in time corresponds to a decrease in distance from the mapping focus, (and thus the first assigned slot would be allocated to the farthest position from the mapping focus in the mapped road segment), and by using feedback to the probe which enables to stop the process of sampling in any one mapping sample, it is possible to save communication resources. The feedback message that would be transmitted to the probes would enable to stop the sampling process for a mapping sample when detecting the first probe (in the opposed queue) which by definition is farthest probe for the mapping sample. Furthermore, the opposite order of allocated slots could also be assigned in order to limit queue mapping to a minimum predetermined range of interest from the mapping focus, in order to save assigning slots for queues that are too short to be of interest. Any feedback message, e.g. busy bits (used with DSMA) or other appropriate message according to a predetermined protocol through the broadcast channel can be used to stop further responses from probe in any mapping sample.

Further saving of communication resources with respect to slot allocation could preferably take benefit of allowing the possibility of missing the detection of a probe in a situation where it is expected that the probe, if it would be detected, would not have significant effect on the determination of the length of the queue. For example, if an a priori knowledge exists about the probe percentage amongst the arriving vehicles in a segment of road, then if for example the probability of successive arrival of probes within a meaningful shorter distance (shorter period of time), compared to the expectation, is not sufficiently high, then an allocation of slots to such a segment of road would preferably be saved. In such cases where there is low significance of effect, rather than no significance, for the detection of probes, then the slots could be allocated for a shorter time, in order to save time at the cost of lowering probability to detect a probe.

When allocation of adjacent frequency slots are assigned with respect to different areas it would preferably be worth to allocate such slots to the respective areas so as to minimize the expected difference in radio propagation path loss between the respective paths from these area related slots and a common base station. This would enable higher discrimination between signals that might be received with a very large difference in received signal strength between each other, while enabling the small signal to be detected.

What is claimed is:

1. A method for use in predicting load of traffic, the method comprising:
    estimating by a mapping system a number of vehicles traveling according to a non-reference route and predicted to deviate from a reference route at a route segment related to a forward time interval, based on a value corresponding to a number of responses generated by one or more match processes corresponding to said vehicles, wherein estimating comprises:
        performing a predetermined differential traffic load match process by said one or more match processes corresponding to said vehicles in response to a traffic prediction update of a traffic prediction system; and
        enabling a predetermined response procedure based on a predicted deviation of a vehicle in relation to said route segment related to said forward time interval.

2. The method according to claim 1, wherein estimating a deviation in said load of traffic comprises estimating said deviation in relation to database statistics.

3. The method according to claim 1, comprising updating database statistics according to a result of estimating said deviation.

4. The method according to claim 3, wherein updating comprises adaptively correcting prior data which lacks sufficient erratic traffic information.

5. The method according to claim 1, wherein estimating said deviation comprises estimating said deviation in relation to at least one response that meets the following criteria:
    the vehicle is not expected to be on said route segment at said forward time interval according to the reference route of the vehicle; and
    the vehicle is expected to be on said route segment at said forward time interval according to a planned non reference route in use by the vehicle.

6. The method according to claim 1, wherein estimating said deviation comprises estimating said deviation in relation to at least one response that meets the following criteria:
    the vehicle is expected to be on said route segment at said forward time interval according to the reference route of the vehicle; and
    the vehicle is not expected to be on said route segment at said forward time interval according to a planned non reference route in use by the vehicle.

7. The method according to claim 1, comprising receiving the traffic prediction update by at least one unit corresponding to at least one vehicle having route guidance capability.

8. The method of claim 1, comprising:
    performing by one or more units corresponding to said vehicles a give-up process according to which if a unit identifies predicted traffic congestion along a planned route of the vehicle, and if the unit determines that the vehicle has one or more alternative routes, then the unit modifies the planned route of the vehicle to an alternative route with a-priori lower priority, according to a predetermined cost.

9. The method of claim 8, comprising:
    based on traffic alleviation resulting from the give-up process, and based on a predetermined criterion, modifying by the unit the route plan of the vehicle associated therewith to an alternative route having a higher priority.

10. The method of claim 8, comprising:
    iteratively receiving traffic prediction information and performing said give-up process, according to a predetermined cost.

11. The method of claim 8, comprising:
    iteratively receiving traffic prediction information and performing said give-up process, according to a predetermined cost, until an equilibrium is reached.

12. The method of claim 1, comprising:
    performing the response procedure by a vehicle-related mobile unit by transmitting a signal to the mapping system over at least one allocated communication slot selected according to a predetermined procedure.

13. The method of claim 1, comprising:
    differentially predicting by the mapping system non-expected traffic on the route segment in relation to the forward time interval, according to a number of response procedures corresponding to a number of vehicles that meet the following criteria:
    the vehicle is not expected to pass through the route segment in the forward time interval in relation to its reference route; and and according the non reference route of the vehicle, the vehicle is expected to pass through the route segment in the forward time interval.

14. The method of claim 1, comprising:
differentially predicting by the mapping system expected traffic which deviates from the route segment in relation to the forward time interval, according to a number of response procedures corresponding to the number of vehicles that meet the following criteria:
the vehicle is expected to pass through the route segment in the forward time interval in relation to its reference route; and
according to the non reference route of the vehicle, the vehicle is not expected to pass through the route segment in the forward time interval.

15. The method of claim 1, wherein reference routes conform with consistent traffic.

16. The method of claim 1, wherein non reference routes affect known traffic statistics as a result of deviation from reference routes.

17. The method of claim 1, wherein at lease some of said vehicles are equipped with mobile units capable of receiving traffic updates, performing a match process, and transmitting a response to the mapping system through a communication platform.

18. The method according to claim 17, wherein estimating comprises estimating a deviation in said load of traffic in relation to a proportion of a number of allocated communication slots occupied by transmitted response signals to a number of allocated communication slots not occupied by transmitted response signals.

19. The method according to claim 17, wherein enabling a predetermined response procedure comprises transmitting one or more predetermined signals by said mobile units.

20. The method according to claim 19, wherein estimating comprises estimating a deviation in said load of traffic in relation to energy bursts received from said mobile units in allocated communication slots occupied by transmitted response signals.

21. The method according to claim 19, comprising randomly selecting at least one allocated communication slot for transmitting said at least one signal.

22. The method according to claim 19, comprising transmitting the at least one signal if the vehicle is not on a reference route of the vehicle.

23. The method according to claim 19, comprises comprising transmitting the at least one signal if the vehicle is not on a default route of the vehicle.

24. The method according to claim 19, comprising receiving said traffic prediction update by a mobile unit having a capability of a potential mobile mapping system.

25. The method of claim 19, comprising:
responding to said traffic prediction update through a slot-oriented discrimination mapping system.

26. A system for use in predicting load of traffic, the system comprising:
a computation platform to estimate a number of vehicles traveling according to a non-reference route and predicted to deviate from a reference route at a route segment related to a forward time interval based on a value corresponding to a number of responses generated by one or more predetermined response procedures corresponding to said vehicles; and
at least one unit associated with at least one of said vehicles, respectively, the unit able to perform a predetermined differential traffic load match process in response to a traffic prediction update of said system, and to enable a predetermined response procedure based on a predicted deviation of a vehicle in relation to said route segment related to said forward time interval.

27. The system of claim 26, wherein the at least one unit is has route guidance capability.

28. A method comprising:
differentially predicting non expected traffic on a route segment in a forward time interval, based on a number of response procedures corresponding to a number of vehicles that are not expected to pass through the route segment in the forward time interval in relation to reference routes of the vehicles, wherein said vehicles are expected to pass through the route segment in the forward time interval according to non reference routes of said vehicles, wherein predicting comprises:
in response to a traffic prediction update, performing a predetermined differential traffic load match process between a route plan of a vehicle and a reference rout of the vehicle according to traffic prediction;
if, according to the match process, the vehicle plans to pass through the route segment in the forward time interval, and according to a reference route of the vehicle the vehicle is not planned to use the route segment in the forward time interval, then enabling a predetermined response procedure according to a prediction of a respective traffic increase effect on the route segment in the forward time interval.

29. The method of claim 28, wherein performing the predetermined differential traffic load match process comprises performing the predetermined differential traffic load match process by a vehicular unit.

30. The method of claim 28, wherein enabling the response procedure comprises enabling the response procedure by a vehicle equipped with a unit having a capability to communicate through a communication platform with a mapping system.

31. The method of claim 28, comprising:
performing by one or more units corresponding to said vehicles a give-up process according to which if a unit identifies predicted traffic congestion along a planned route of the vehicle, and if the unit determines that the vehicle has one or more alternative routes, then the unit modifies the planned route of the vehicle to an alternative route with a-priori lower priority, according to a predetermined cost.

32. A method comprising:
differentially predicting expected traffic which deviates from a route segment in a forward time interval, based on a number of response procedures corresponding to a number of vehicles that are expected to pass through the route segment in the forward time interval in relation to reference routes of the vehicles, wherein said vehicles are not expected to pass through the route segment in the forward time interval according to non reference routes of said vehicles, wherein predicting comprises:
in response to a traffic prediction update, performing a predetermined differential traffic load match process between a route plan of a vehicle and a reference rout of the vehicle according to traffic prediction;
if according to the match process the vehicle plans to pass through the route segment in the forward time interval, and according to the reference route of the vehicle the vehicle is not planned to use the route segment in the forward time interval, then enabling a predetermined response procedure according to a prediction of a respective traffic decrease effect on the route segment in the forward time interval.

33. The method of claim 32, wherein performing the predetermined differential traffic load match process comprises performing the predetermined differential traffic load match process by a vehicular unit.

34. The method of claim 32, wherein enabling the response procedure comprises enabling the response procedure by a vehicle equipped with a unit having a capability to communicate through a communication platform with a mapping system.

35. The method of claim 32, comprising:

performing by one or more units corresponding to said vehicles a give-up process according to which if a unit identifies predicted traffic congestion along a planned route of the vehicle, and if the unit determines that the vehicle has one or more alternative routes, then the unit modifies the planned route of the vehicle to an alternative route with a-priori lower priority, according to a predetermined cost.

* * * * *